Jan. 20, 1959     T. A. WETZEL     2,869,429

PATTERN CONTROLLED MACHINE TOOL

Filed Oct. 16, 1952     5 Sheets-Sheet 1

INVENTOR
Theodore A. Wetzel

INVENTOR
Theodore A. Wetzel
BY
Elroy J. Wutschel
Attorney

Jan. 20, 1959 T. A. WETZEL 2,869,429
PATTERN CONTROLLED MACHINE TOOL
Filed Oct. 16, 1952 5 Sheets-Sheet 5
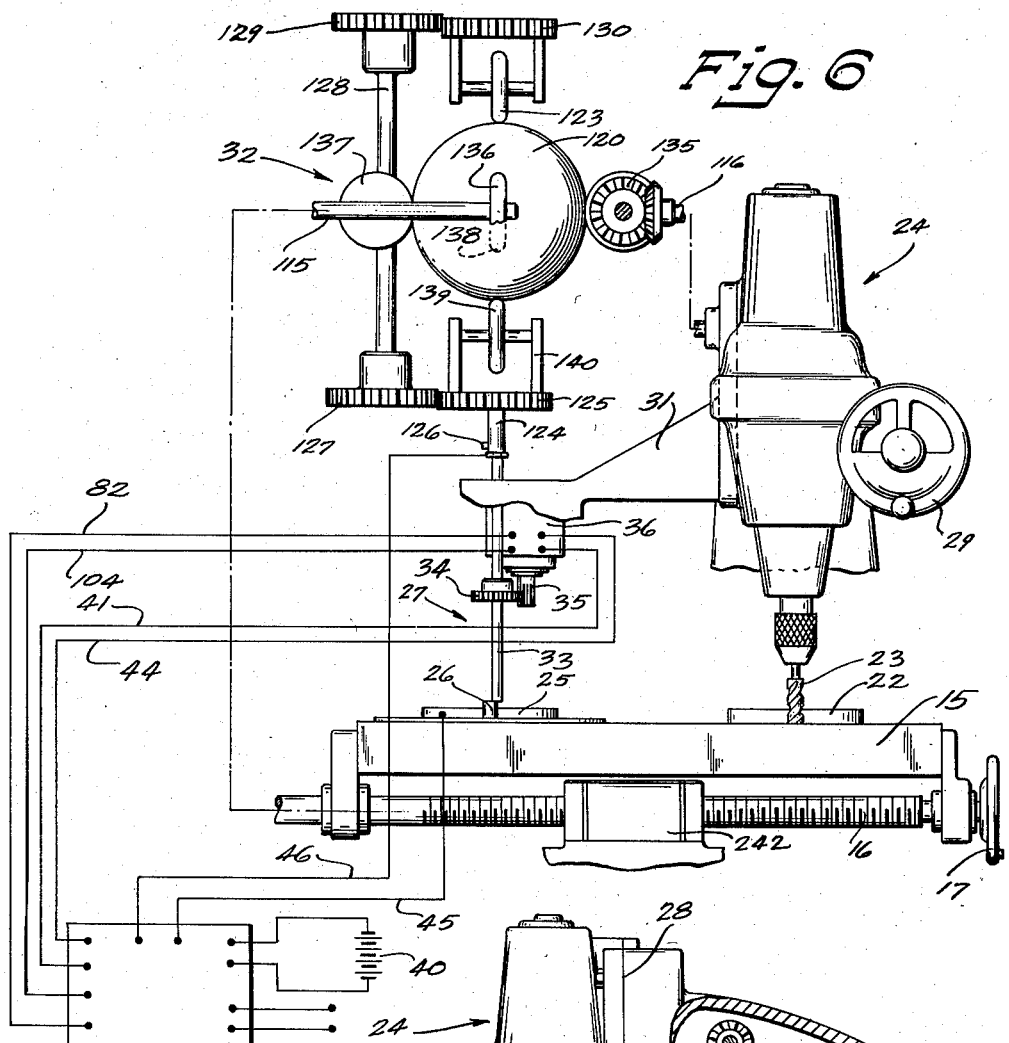
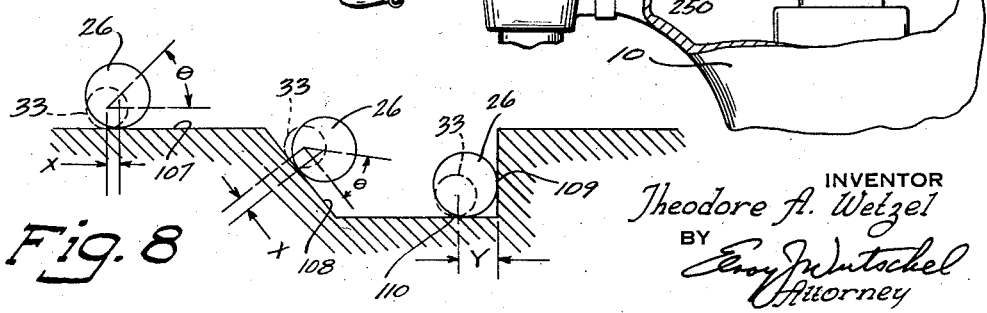
INVENTOR
Theodore A. Wetzel
BY
Elroy Wutschel
Attorney

United States Patent Office 2,869,429
Patented Jan. 20, 1959

2,869,429

PATTERN CONTROLLED MACHINE TOOL

Theodore A. Wetzel, Milwaukee, Wis., assignor to Kearney & Trecker Corporation, West Allis, Wis., a corporation of Wisconsin Application October 16, 1952, Serial No. 315,034

9 Claims. (Cl. 90—13.5)

This invention relates generally, to improvements in machine tools and more particularly to improved actuating and controlling mechanism especially adapted for effecting and regulating the operation of pattern controlled machine tools.

A general object of the present invention is to provide more efficient actuating and controlling apparatus for a machine tool.

Another object of the invention is to provide an improved pattern controlled machine tool adapted to function at maximum efficiency in machining a surface of irregular contour on a workpiece.

Another object is to provide an improved machine tool transmission especially adapted for pattern control.

Another object is to provide a pattern controlled machine tool in which the rate of relative feeding movement between the forming cutter and the workpiece is maintained substantially constant regardless of the direction of the feeding movement.

Another object is to provide an improved machine tool transmission which inherently operates to regulate the relative movement between the cutter and workpiece so that such movement is at a substantially constant rate regardless of the direction in which the movement occurs.

Another object is to provide an improved machine tool transmission which will divide a rotary movement into two components in infinitely variable proportions but always in a sine-cosine relationship.

A further object is to provide an improved transmission which will variably resolve a rotary motion into two proportional components.

Another object is to provide an improved machine tool transmission in which power is transmitted through a sphere to the several movable elements of the machine.

A more specific object is to provide an improved machine tool transmission in which the power for actuating several movable elements of the machine is taken from a rotating ball, and the rate of movement of the movable elements is varied by repositioning the axis of rotation of the ball.

A further object is to provide an improved pattern controlled machine tool which will machine a smooth surface on the contour of the workpiece.

A still further object is to provide an improved pattern controlled machine tool which will accurately reproduce a pattern on a workpiece at rapid rates of feeding movement between the cutter and the workpiece.

According to this invention an improved pattern controlled machine is provided for forming contoured surfaces, the power for effecting traverse of two movable elements being obtained from a rotating sphere. To this end the sphere is mounted for rotation about an infinite number of axes and is driven by a drive wheel having frictional engagement with the surface of the sphere. The drive wheel is arranged to be steered to change the position of its axis of rotation for the purpose of effecting a corresponding change in the axis of rotation of the sphere. The power for traversing the movable elements of the machine tool is received from the rotating sphere by two power take-off wheels. The latter are rotatably mounted with their peripheries in frictional engagement with the sphere and their axes of rotation in the same plane but disposed 90° relative to each other. The power take-off wheels are each connected to drive one of the movable elements in its path of movement. Since they are in frictional contact with the surface of the sphere they will be driven at a peripheral speed equal to the surface speed of that part of the sphere that they are in contact with. The surface speed of the sphere at the points of contact with the power take-off wheels may be varied by changing the axis of rotation of the sphere and this can be readily accomplished by steering the drive wheel to vary the position of its axis of rotation, because the axis of rotation of the sphere will always remain parallel to the axis of rotation of the drive wheel regardless of the position that the drive wheel is turned to. Since the axes of rotation of the power take-off wheels are disposed in the same plane 90° apart, their speeds will vary as the cosine of the angle that the axis of rotation of the sphere makes with the axis of the particular driven wheel. The steering of the drive wheel is accomplished by a tracer which is provided with a stylus for contacting the pattern. The stylus contacts the surface of the pattern and as it does so it swivels to accommodate the contour of the pattern. The stylus, in turn, causes the tracer shaft to swivel with it to effect a corresponding turning movement of the axis of rotation of the drive wheel. In this manner the axis of rotation of the sphere is varied in response to the contour of the pattern to vary the speed of the power take-off wheels and their associated movable elements. The change in the rate of travel of the movable elements produces a corresponding change in the relative movement between the cutting tool and the workpiece to cause the cutter to reproduce the pattern in the workpiece.

The foregoing and other objects of this invention, which will become more fully apparent from the following detailed specification, may be achieved by the particular pattern controlled milling machine constituting an exemplifying embodiment of the invention that is illustrated in and described in connection with the accompanying drawings, in which:

Fig. 6 is diagrammatic view of the transmission and control mechanism embodying the invention as incorporated in the machine shown in Fig. 1;

Fig. 7 is an enlarged detailed view of the spindle head shown assembled to the machine in Fig. 1 with parts broken away to depict the spindle driving train; and, Fig. 8 is a diagrammatic plan view showing the relation of the tracer stylus with respect to the tracer shaft as the stylus follows the path of the pattern.

Figure 1:
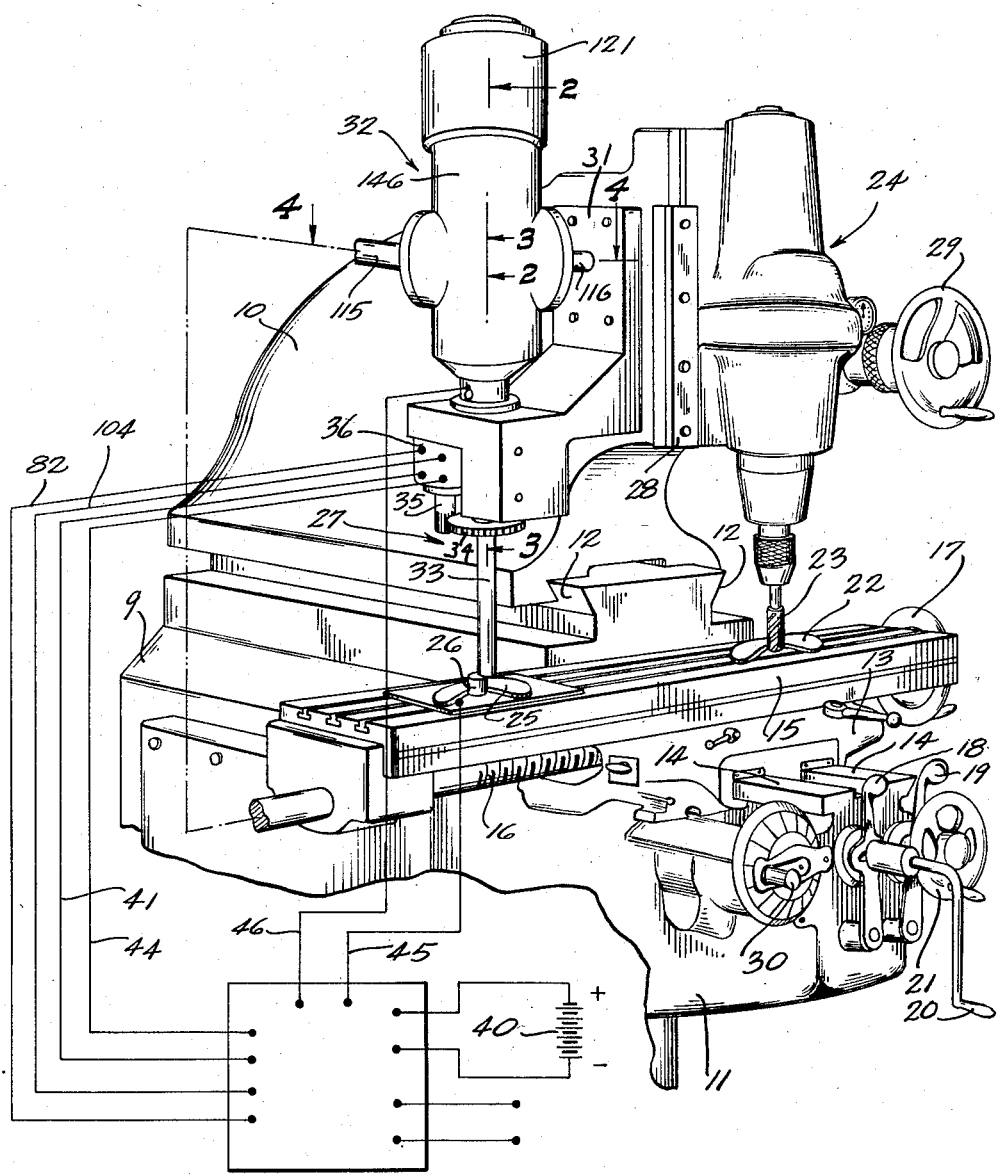
Figure 1 is a fragmetary perspective view partly diagrammatic of a pattern controlled milling machine constituting apparatus incorporating the invention in a practical form.

Referring more specifically to the drawings, and particularly to Figure 1 thereof, a practical, operative embodiment of the present invention is there shown incorporated in a milling machine, comprising a base 9 that serves as a support for a carriage 10 and a knee 11.

The carriage 10 is mounted on the top of the base 9 for movement in a horizontal plane being guided in its path of movement by ways 12. The knee 11 is carried by the base 9 for movement in a vertical path, being guided along its path of travel by suitable ways (not shown) provided on the front face of the base.

The knee 11 supports a saddle 13 for movement in a horizontal plane in a path substantially parallel to the path of movement of the carriage 10. The top of the knee 11 is shaped to form ways 14 which guide the saddle 13 in its path of travel. The saddle 13, in turn, carries a table 15 for longitudinal movement in a direction transverse to the direction of movement of the carriage 10, suitable ways (not shown) being formed in the top of the saddle 13 for guiding the table 15 in its path of movement.

Movement of the table 15 is effected by rotating a screw 16, either manually by revolving a handwheel 17, or by power in a manner to be later described. The knee 11 and saddle 13 may also be actuated in their paths of movement by power in either direction, being arranged to be connected for power movement by manipulating a pair of control levers 18 and 19 respectively. Manual movement of the knee 11 is produced by turning a handle 20 while the saddle 13 may be actuated in its path of movement manually by revolving a handwheel 21.

The table 15 carries a workpiece 22 in position for engagement by a cutter 23 which is rotatably supported by a spindle head generally denoted by the numeral 24. Also mounted on the table 15 is a pattern 25 disposed for engagement by a stylus 26 of a tracer mechanism generally denoted by the numeral 27, the tracer mechanism being arranged to produce a signal in response to the contour of the pattern 25 for the purpose of controlling the relative movement between the cutter 23 and the workpiece 22 so that the pattern may be reproduced in the workpiece.

The front face of the carriage 10 is provided with ways 28 for slidably supporting the spindle head 24 for vertical movement, the spindle head being actuated in its path of movement by rotating a handwheel 29. The spindle head 24 rotatably supports the cutter 23 in position to operate upon the workpiece 22 mounted on the table 15. Power for rotating the cutter 23 is obtained from a motor (not shown), the power being transmitted to the cutter in a well known manner.

A variety of movements have been provided in the machine shown in Figure 1, only two of which are utilized for performing the reproducing operation. The two movements which are controlled by the tracer mechanism 27 for reproducing the pattern 25, are the movement of the carriage 10 and the movement of the table 15, the direction of travel of these two members being in two mutually transverse paths. The other movements have been provided to facilitate setting the machine for the reproducing operation and to enable it to be utilized as a conventional milling machine, not involving a reproducing operation. To this end, a feed rate selector lever 30 is provided for the purpose of selecting the rate of travel of the several movable elements when they are power driven for normal milling operations other than reproducing.

A bracket 31 is mounted on the side of the carriage 10, extending outwardly therefrom to support the reproducing system comprising the tracer mechanism 27, and a ball transmission generally denoted by the numeral 32. The tracer mechanism 27 includes a tracer shaft 33 having secured to its lower end the stylus 26 disposed eccentrically with respect to the tracer shaft 33. The upper portion of the tracer shaft 33 has keyed to it a spur gear 34 having meshing engagement with a pinion 35. The pinion 35, in turn, is keyed to the output shaft of a direct current motor 36. Thus, there is driving engagement between the motor 36 and the tracer shaft 33 so that when the motor 36 is energized, it serves to rotate the tracer shaft 33 and its associated stylus 26.

Figure 5:
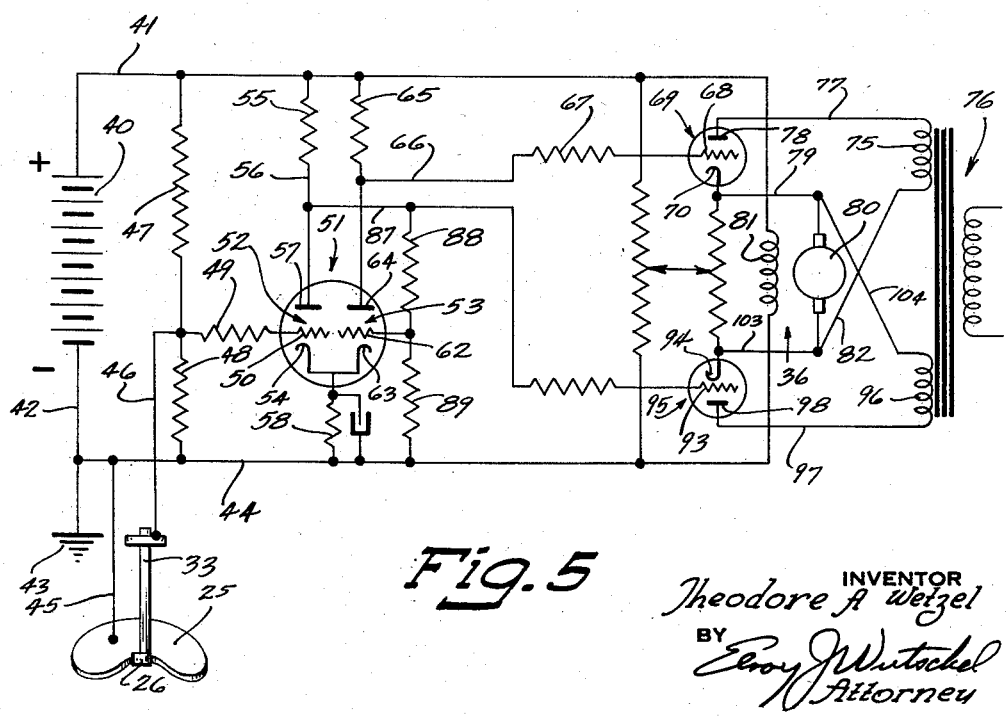
Fig. 5 is a schematic circuit diagram of the electric system for actuating the tracer mechanism.

Although the motor 36 is connected to rotate the tracer shaft 33, it does not effect complete rotation, but functions to vibrate the stylus 26 into and out of engagement with the pattern 25. Such vibration occurs by reason of the inclusion of the tracer shaft 33 and the pattern 25 in the motor control circuit, with the latter two elements cooperating to function in the manner of a switch. The electrical circuit for effecting this vibratory movement of the stylus 26 into and out of engagement with the pattern, is illustrated diagrammatically in Fig. 5.

As there shown, voltage is obtained from a direct current source 40 having a line 41 connected to its positive side and a line 42 connected to its negative side. The line 42, in turn, is connected to a ground 43 and has connected to it a line 44 which carries the negative side of the circuit. The pattern itself is fabricated of an electrically conductive material, and is connected to the negative line 44 by a conductor 45, while the tracer shaft 33 has electrical connection with a conductor 46, the latter being connected between a pair of resistors 47 and 48, which are serially connected across the lines 41 and 44.

There is also connected between the resistors 47 and 48, one end of a resistor 49 having its other end connected to a grid 50 of a double triode vacuum tube generally denoted by the numeral 51, one unit of which is identified in the drawing by the numeral 52 and the other unit being identified by the numeral 53. When the stylus 26 of the tracer shaft 33 is out of engagement with the pattern 25, the voltage on the grid 50 is positive with respect to a cathode 54, so that the current will flow through the unit 52 of the double tube 51. The current flows from the line 41, through a resistor 55 and a conductor 56 to an anode 57, and then to the cathode 54 and a resistor 58 to return to its source through the lines 44 and 42.

While the unit 52 of the tube 51 is conducting current, a grid 62 of the other unit 53 is negative with respect to its associated cathode 63 so that there is no flow of current through the unit 53. Since the unit 53 of the tube 51 is not conducting, the positive voltage connects from the line 41 to a resistor 65 and then through a conductor 66 and another resistor 67 to a grid 68 of an electronic tube generally denoted by the numeral 69. This voltage on the grid 68 of the electronic tube 69 with respect to its cathode 70 causes the tube to become conductive and permit a flow of electrical energy from a secondary coil 75 of a transformer 76, through a conductor 77 to an anode 78 of the tube 69 and thence to the cathode 70. From the cathode 70 the flow of current continues through a conductor 79, to an armature 80 of the direct current motor 36 which has its field 81 connected across the direct current lines 41 and 44. From the armature 80 the current flows into a conductor 82 to return to its source represented by the secondary coil 75 of the transformer 76. With the motor 36 thus energized it functions to rotate the tracer shaft to move its associated stylus into contact with the pattern.

When this occurs, the resistor 48 is by-passed to connect the resistor 47 directly to the negative line 44 through a conductor 46, to reduce the positive voltage on the grid 50 and render it negative with respect to its cathode 54 and stop the flow of anode current across the unit 52 of the tube 51. When the anode current stops flowing through this unit 52 of the tube 51, the voltage on the grid 62 with respect to its cathode 63 becomes more positive due to an increase in current flow through a pair of serially connected resistors 88 and 89 to the ground 43 by way of the line 44 as occasioned by the increased potential of the anode 57 when unit 52 is nonconducting. Such change in the voltage on the grid 62 renders the unit 53 of the tube 51 conductive. As the unit 53 of the tube 51 begins to conduct electricity, the voltage of the grid 68 diminishes with respect to its cathode 70, and the tube 69 ceases conducting to terminate the armature current and hence the torque of the motor 36 in a direction to move the stylus into engagement with the pattern.

However, a termination of the flow of current from the anode 57 to the cathode 54 of the unit 52 of the tube 51 causes a decrease in voltage across the load resistor 55 to cause a grid 93 to become more positive with respect to its cathode 94 and permit current flow through a tube 95. When the tube 95 is rendered conductive, it completes an electrical circuit originating at a source represented by a secondary coil 96 of the transformer 76, and continuing through a conductor 97 to an anode 98 of the tube 95. From the anode 98 the current flows to the cathode 94, and thence, through a conductor 103 into the armature 80. From the armature 80 the current returns to the source through a conductor 104 to the secondary coil 96.

It will be noted that with the tube 95 conducting, the current through the armature 80 is in a reverse direction from that when the tube 69 is conducting the opposite flow of armature current, causing a torque reversal resulting in stylus motion away from the pattern. Thus, the stylus is vibrating into and out of engagement electrically with the pattern, at a very rapid rate due to the rapid action of the tubes in the control circuit in response to the control signal.

In addition to the directional control exercised over the motor 36 by the voltage impressed upon the grids 68 and 93, the motor is further controlled by its own counter electromotive force, which functions to prevent its overrunning. For example, it will be assumed that the stylus 26 is not in contact with the pattern 25 so that a voltage is impressed upon the grid 68 of the tube 69 to render the tube conductive. With the tube 69 conducting, the armature circuit is closed as previously described for rotating the armature 80 in a direction to move the stylus 26 into engagement with the pattern.

The flow of current through the tube 69 depends upon the voltage of the grid 68 being greater than the voltage upon the cathode 70. As the flow of current through the tube 69 continues, the speed of the motor 36 increases. However, as the speed of the motor increases, its counter electromotive force increases proportionately, to increase the voltage upon the cathode 70 so that it approaches the voltage of the grid 68 and thereby reduces the difference in potential between the grid 68 and the cathode 70 to limit the flow of current through the tube.

If the motor 36 was connected for unidirectional operation, its counter electromotive force would serve to govern the speed of the motor, preventing it from attaining excessive speeds. Since the direction of rotation of the motor 36 is alternating rapidly in the present arrangement, the effect of its counter electromotive force is to prevent the motor from overrunning its movement in either direction. Since the difference in potential between the grid 68 and the cathode 70 is limited by the counter electromotive force of the motor 36, it requires only a slight decrease in the voltage of the grid 68 to stop the flow of current through the tube 69 and terminate the torque of the motor 36. This results in a faster response of the motor to the signal of the stylus 26 and a greater frequency of vibration of the stylus.

Upon a reversal of the direction of rotation of the motor, its counter electromotive force is impressed upon the cathode 94 of the tube 95. This results in the same effect on the conductivity of the tube as described above for the tube 69. Thus, the same effect is achieved in either direction of rotation of the motor 36.

As the motor 36 is being actuated in its two directions of movement, it serves to similarly actuate the tracer shaft 33 by reason of the connection previously described. Such movement of the tracer shaft 33, in turn, causes a corresponding vibratory movement of the stylus 26 which is secured to the lower end of the tracer shaft 33 and eccentrically disposed therewith in position to engage the contour of the pattern 25. The eccentricity of the stylus 26 with respect to its cooperating shaft 33 is clearly illustrated diagrammatically in Fig. 8, where the tracer shaft 33 is depicted by a dotted circle and the stylus 26 is shown as a solid circle, the two elements being superimposed to illustrate their relationship as the stylus progresses along the contour of a pattern.

A line drawn through the axis of the tracer shaft 33 and the axis of the stylus 26 forms an angle with a line representing the path of movement of the tracer shaft 33, which would be parallel to a line tangent to the contour of the pattern. It has been found that for optimum results the eccentricity of the stylus 26 with respect to the tracer shaft 33 should be such that the value of the angle will be 45°. Such eccentricity of the stylus 26 permits it to be moved into and out of engagement with the pattern by the rotary movement of the tracer shaft 33.

It is to be understood that the movement of the stylus 26 away from the pattern is of a very minute degree, since immediately upon being moved out of communication with the pattern, the control circuit previously described, responds to reverse the direction of movement and re-engage the stylus 26 with the pattern. Similarly, when the stylus 26 makes electrical contact with the pattern, the electrical control circuit again responds to reverse the direction of movement and move the stylus out of engagement with the pattern. Thus, a very rapid vibratory movement occurs when the stylus 26 moves along the contour of the pattern, and as it does so it vibrates into and out of electrical engagement with the surface of the pattern. Thus, as the contour of the pattern changes, the tracer shaft 33 will orient itself accordingly to always place the stylus 26 into engagement with the pattern, after a short pivoting movement of the stylus 26 away from the pattern.

As the tracer shaft pivots in this manner, in accordance with the contour of the pattern, to intermittently bring the stylus 26 into electrical contact with the pattern, it produces a control signal for regulating the movement of the carriage 10 and the table 15 in their respective paths of travel, for the purpose of causing the stylus 26 to follow the contour of the pattern, as well as effecting relative movement between the cutter 23 and the workpiece 22 to reproduce the pattern in the workpiece. The manner in which the rotary movement of the tracer shaft 33 operates to vary the rate of movement of the carriage 10 and the table 15 will be subsequently described.

In addition to permitting a movement into and out of engagement with the pattern by a rotary movement of the tracer shaft 33, the eccentricity of the stylus 26 with respect to its supporting shaft 33 serves an additional purpose of anticipating the change in contour of the pattern, for the purpose of increasing the accuracy of the reproduction. In automatic reproducing machines it is inherent that a certain lag in motion response exists between the time when the tracer produces a control signal from the pattern, and when the correction is made to change the path of movement of the cutter correspondingly and terminate the signal. The more abrupt such change in the pattern is, the greater lag in supplying correction for cutter travel direction, because of the fact that a greater change must be produced in the control system to accommodate the change in the path of the contour of the pattern. In the past, it has been customary to anticipate the contour of the pattern by a constant amount in spite of the fact that the lag of the change in the path of the cutter travel in response to the control signal will vary with the degree of change in the pattern. With the present tracer mechanism, utilizing an eccentric stylus, the amount of anticipation will vary with the degree of change in the contour of the pattern.

This unique feature of the tracer mechanism 27 is clearly illustrated in Fig. 8 where the stylus 26 is shown as it progresses along the contour of the pattern. For the purpose of this description, it will be assumed that the cutter 23 is disposed in the same position with respect to the workpiece 22 that the tracer shaft 33 assumes with respect to the pattern 25. Thus, in Fig. 8, the illustration of the tracer shaft 33 as a dotted circle, also depicts the position of the cutter 23 with respect to the workpiece 22. With this in mind, the diagrammatic view of Fig. 8 serves the purpose of illustrating the relative position of the stylus 26 with respect to the tracer shaft 33 as well as the relative position of the stylus 26 and the pattern 25 in comparison with the position of the cutter 23 relative to the workpiece 22.

In the first position of the stylus 26 as shown in Fig. 8, the stylus is depicted following a straight line portion of the pattern, there being no change in contour at this point. Under these conditions the eccentricity of the stylus 26 causes it to contact the pattern a distance X in advance of the point that the cutter 23 is contacting the workpiece 22. It will be understood, of course, that the lag of the control system would produce an error in the reproduction of the pattern in terms of thousandths of an inch, and that the advance X is shown exaggerated in Fig. 8 for the purpose of clarifying the illustration. The distance of advance X will remain constant as the stylus 26 progresses along the straight line portion 107 of the pattern.

In the second position of the stylus 26, it is shown contacting an angular surface 108 of the pattern with the stylus 26 traveling along a straight line and encountering no change in the contour of the pattern. Under these conditions the tracer shaft 33 has re-oriented itself to accommodate the angular surface as opposed to the surface 107. However, since this portion of the pattern is also a straight line, and the stylus 26 is not encountering a change in pattern contour, the position of the stylus 26 with respect to the pattern is in advance of the position of the cutter 23 with respect to the workpiece 22 the same distance X as it was in the first illustrated position of the stylus 26.

In the third illustrated position of the stylus 26 in Fig. 8, the stylus is shown encountering a 90° interior angle in the pattern. Under this condition, the stylus is producing a maximum anticipation, contacting the pattern at a point 109 while the cutter is contacting the workpiece at a point 110, the stylus contacting the pattern a distance Y in advance of the point of contact of the cutter 23 with the workpiece 22. Thus, it is readily apparent that upon encountering an abrupt change in the path of travel of the cutter 23, the distance of advance of the point of contact of the stylus 26 with the pattern in respect to the point of contact of the cutter 23 with the workpiece 22 increases substantially as illustrated by the variance of the distance Y to the distance X.

In the illustration in Fig. 8, X represents the amount of anticipation existing when the stylus 26 is following a straight line along the pattern in any direction, while Y represents its maximum anticipation, which occurs when the stylus encounters a 90° inside corner. For the purpose of this description the straight line path of the stylus 26 may be termed a 180° angle, as it can be readily seen from Fig. 8, that when the stylus 26 encounters an inside angle of a value between 90° and 180°, the amount of anticipation will vary inversely as the size of the angle, always being of some value between that of X and Y. For example, if the angle of the inside corner were 135°, the change would not be as abrupt as exists with a 90° inside angle, and therefore the amount of anticipation would be of a value less than Y but greater than X which is the amount of anticipation for a 180° angle.

It will be noted that the amount of anticipation increases with an increase in the abruptness of the change of the contour of the pattern for an inside corner, but the same is not true when an outside corner is encountered, no increase in anticipation being provided upon the occurrence of an outside corner. Such condition, however, is not serious, because when overtravel occurs at an inside corner, damage which cannot be remedied will be inflicted upon the workpiece, and possibly upon the cutter, on the other hand, at an outside corner, such overtravel will only cause a small amount of additional metal to remain upon the workpiece, which may be later removed by filing or other metal removing process to provide an accurate reproduction of the pattern. Since the overtravel, at any rate, will not be of any great extent, such excess metal may be readily removed. With this arrangement, a variable anticipation depending upon the contour of the pattern may be obtained for inside corners where it is most important, without requiring a complex tracer mechanism.

The rotary movement of the tracer shaft 33 as it is oriented about its axis for the purpose of accommodating the contour of the pattern 25 to bring the stylus 26 into contact with the pattern, is transmitted directly to the ball transmission 32 for the purpose of varying the distribution of power to two output shafts 115 and 116 of the ball transmission 32. Power for rotating the output shafts 115 and 116 is obtained from a rotating ball or sphere 120, the rate of rotation of the output shafts 115 and 116 being changed by changing the axis of rotation of the ball 120. The tracer shaft 33 is connected to vary the axis of rotation of the ball 120, as it pivots in accordance with the contour of the pattern. As the contour of the pattern changes, and the tracer shaft 33 re-orients itself about its axis to accommodate the pattern, the axis of rotation of the ball 120 will change accordingly, to thereby vary the rate of rotation of the output shafts 115 and 116, and therefore the rate of travel of the table 15 and the carriage 10 respectively.

For the purpose of clarity, the operation of the ball transmission 32 will be described from the diagrammatic view in Fig. 6, where only the principal parts of the transmission are shown, and are illustrated there schematically. Power for rotating the ball 120 is obtained from a motor 121, shown in Fig. 2, its shaft 122 being connected in a manner to be later described, to rotate a drive wheel 123 which is in frictional driving engagement with the ball 120.

In addition to being rotatable about its own axis by the motor 121, the drive wheel 123 is rotatable bodily, to change the position of its axis of rotation, and thereby change the position of the axis of rotation of the ball 120. Such pivotal movement of the drive wheel 123 is effected by the rotational movement of the tracer shaft 33. The rotational movement of the tracer shaft 33 is transmitted to the drive wheel 123 through a gear train, the tracer shaft 33 being fixed within an elongated hub 124 of a gear 125 by a set screw 126. The gear 125 has meshing engagement with a cooperating gear 127 which is keyed to a rotatably mounted vertical shaft 128. The upper end of the shaft 128 has keyed to it a gear 129 having meshing engagement with a gear 130, the latter being connected to effect bodily rotation of the drive wheel 123. Thus, by reason of the above described connection, the rotary movement of the tracer shaft 33 is transmitted to the drive wheel 123 to change the position of its axis of rotation and thereby vary the axis of rotation of the ball 120

As previously stated, power from the rotating ball 120 is utilized for driving the shafts 115 and 116, the rotation of the ball being resolved between these two shafts in a sine-cosine relationship Power for driving the shafts 115 and 116 is taken from the ball 120 by a pair of power take-off wheels 135 and 136, the take-off wheel 135 being connected to drive the carriage 10 in its path of movement, and the take-off wheel 136 being connected to drive the table 15 in its path of movement as shown diagrammatically in Fig. 6.

The ball 120 is retained in position, and in frictional driving engagement with the drive wheel 123, and the take-off wheels 135 and 136 by three idler wheels. Two of these idler wheels 137 and 138 are in contact with the ball 120 at points diametrically opposite the point of engagement of the power take-off wheels 135 and 136 respectively, to retain the ball in driving engagement with these two power take-off wheels. In like manner an idler wheel 139 is in contact with the ball 120 at a point diametrically opposite the point of contact with the drive wheel 123, to retain the ball in driving engagement with the drive wheel.

The idler wheel 139 is rotatably mounted in a bracket 140 which is fixed to rotate with the gear 125. It will be recalled that the gear 125 is in the train for transmitting the rotary motion of the tracer shaft 33 to the drive wheel 123, so that as the axis of the drive wheel 123 is revolved to change the axis of rotation of the ball 120, its cooperating idler wheel 139 will revolve in unison with it so that these two cooperating wheels are always in alignment.

From the above description of the general construction of the ball transmission it is apparent that when the drive wheel 123 is revolved about its horizontal axis it will cause the ball 120 to revolve, and the axis of rotation of the ball 120 will be parallel to the axis of rotation of the driving wheel 123, this being true regardless of the position that the axis of the drive wheel 123 is turned to by the tracer shaft 33 as it follows the contour of the pattern. The power take-off wheels 135 and 136 being in frictional contact with the surface of the ball 120 will be driven with a peripheral speed equal to the surface speed of that part of the ball 120 that they are in contact with. This speed will vary as the cosine of the angle that the axis of rotation of the ball 120 makes with the axis of the driven power take-off wheels 135 or 136.

Because of this sine-cosine relationship between the speeds of the two power take-off wheels 135 and 136, the carriage 10 and the table 15, which receive their power from the two take-off wheels, will also travel at feed rates in a sine-cosine relationship. Such an arrangement is ideal for reproducing machines, for effecting movement in two paths, for the purpose of obtaining a substantially uniform rate of feed of the cutter along the workpiece. Thus, as the axis of rotation of the ball 120 is changed to increase the speed of the carriage 10, the speed of the table 15 is decreased accordingly, and vice versa. At a maximum speed of either one of the two elements 10 or 15, the other element will remain stationary.

Figure 2:
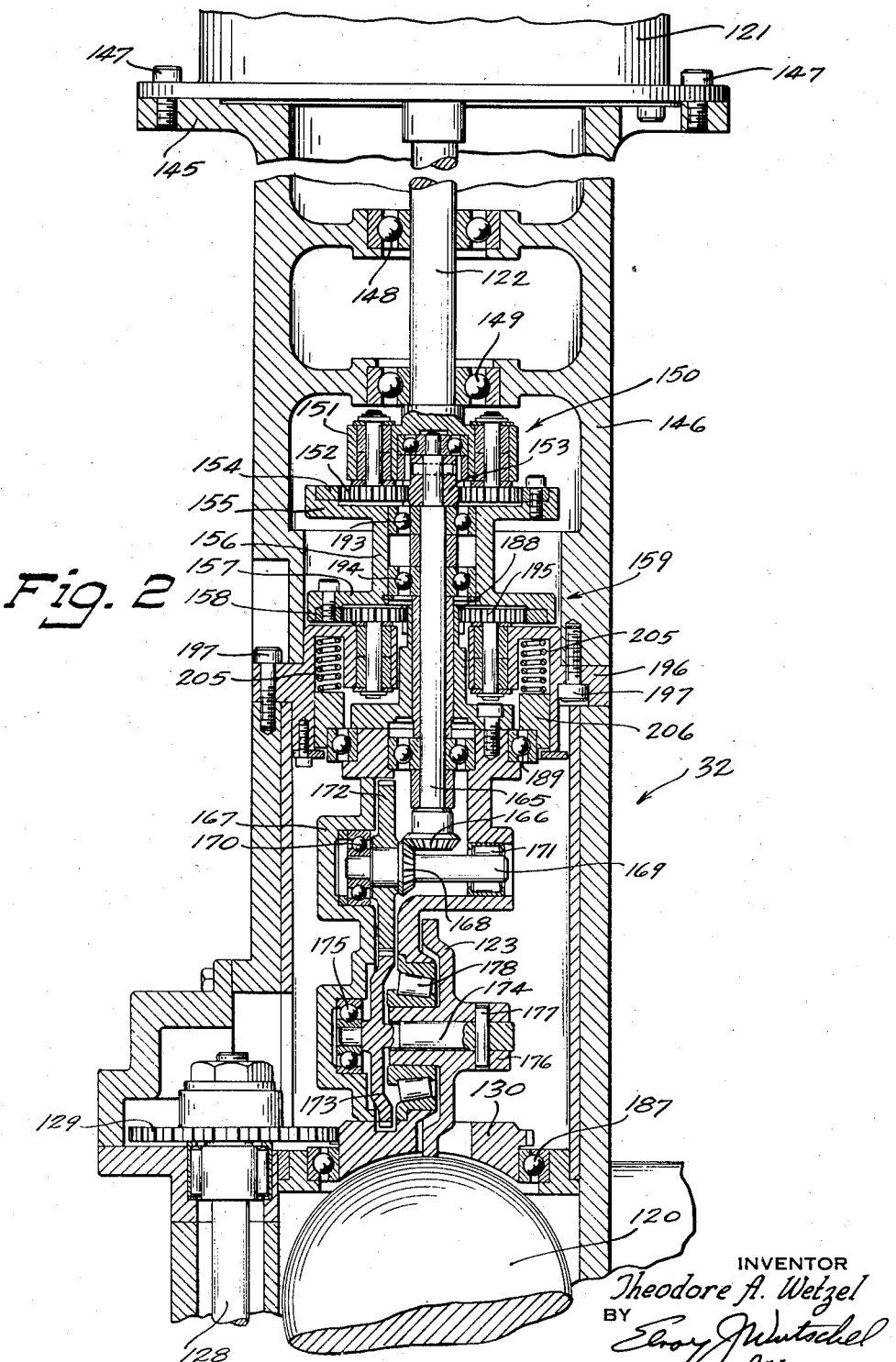
Fig. 2 is an enlarged detailed view of a part of the ball transmission taken in vertical section substantially along the line 2—2 of Fig. 1.
Figure 3:
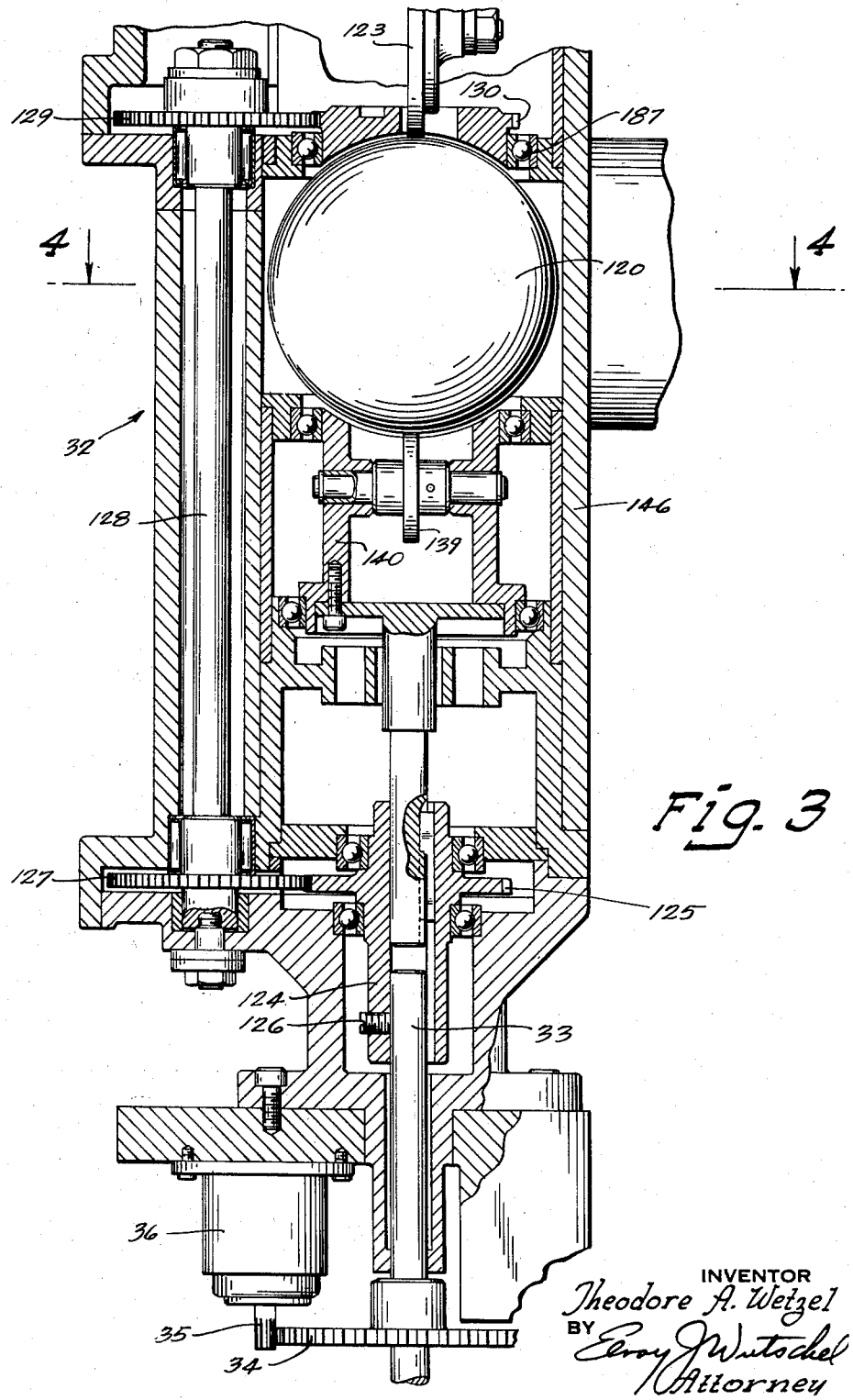
Fig. 3 is an enlarged fragmentary detailed view of the lower portion of the ball transmission taken in vertical section along the line 3—3 of Fig. 1.
Figure 4:
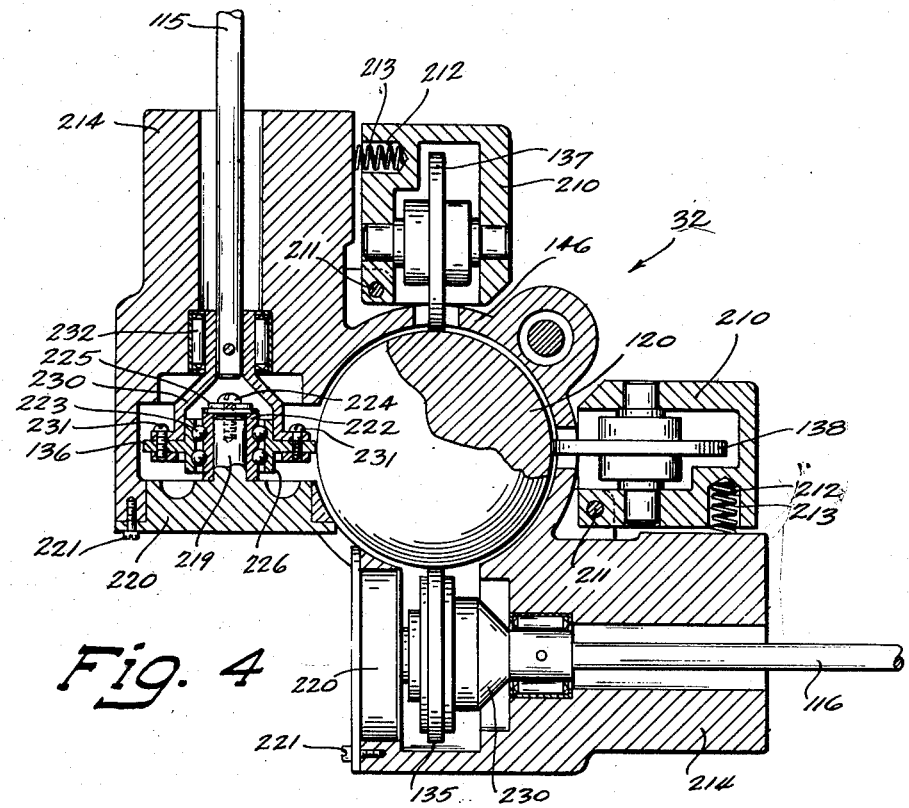
Fig. 4 is a detailed view in horizontal section taken through ball transmission along the line 4—4 in Fig. 3.

The actual construction of the ball transmission 32 is illustrated in Figs. 2, 3 and 4, where the drive motor 121 is shown mounted on a top flange 145 of a housing 146 which encloses the entire mechanism of the ball transmission. The motor 121 is secured to the flange 145 by suitable screws 147, with its shaft 122 extending downwardly into the housing 146, being journalled therein by a pair of ball bearings 148 and 149. The motor shaft 122 is connected to drive a planetary gear system generally denoted by the numeral 150, its lower end being secured to a spider 151 in which are rotatably mounted a plurality of planetary gears 152. As the motor shaft 122 rotates the spider 151, the latter drives the planetary gears 152 in an orbital movement about a sun gear 153 with which they are in meshing engagement. The planetary gears 152 are also in meshing engagement with an internal ring gear 154, which may be considered as fixed with respect to the planetary gears 152. The ring gear 154 is mounted in an upper flange 155 of a double flange collar 156 also having a lower flange 157 for supporting a second ring gear 158 of another planetary gear system generally denoted by the numeral 159.

The sun gear 153 is keyed to the upper end of a shaft 165 which has keyed to its lower end a bevel gear 166, the shaft extending downwardly from the planetary gear system 150 into a housing 167, the latter serving to enclose the gear train transmitting power to the drive wheel 123. The bevel gear 166 has meshing engagement with a cooperating bevel gear 168 keyed to a stub shaft 169 which is journalled in the housing 167 by suitable bearings 170 and 171. A spur gear 172 is integrally formed with the stub shaft 169 and has meshing engagement with another spur gear 173. The spur gear 173 is integrally formed with a shaft 174 which is journalled in the housing 167 by a ball bearing 175 and extends outwardly therefrom into a hub 176 of the drive wheel 123. The shaft 174 is secured to the hub 176 by a pin 177, so that it will revolve in unison with the drive wheel 123. The inner end of the hub 176 is also journalled in the housing 167 by a tapered roller bearing 178 so that the entire unit is supported for free rotation.

Power for rotating the ball 120 is transmitted from the motor 121 through the above described gear train to rotate the drive wheel 123. As the motor shaft 122 rotates, it causes its associated spider 151 to rotate with it for the purpose of actuating the planetary gears 152 in an orbital movement. Since the ring gear 154 is relatively fixed, the orbital movement of the planetary gears 152 produces rotation of the sun gear 153, and therefore of the shaft 165 to which it is keyed. The bevel gear 166 rotates with its associated shaft 165 to effect a corresponding rotation of the bevel gear 168 with which it has meshing engagement. Actuation of the bevel gear 168 effects a corresponding rotation of the spur gear 172 to produce a rotation of the spur gear 173 with which it is in mesh. Since the spur gear 173 is integrally formed with the shaft 174 the latter rotates with it causing rotation of the drive wheel 123 which is keyed to the shaft. Rotation of the drive wheel 123 produces rotation of the ball 120 about an axis parallel to the axis of rotation of the drive wheel 123.

The ball 120 will always adapt itself to rotate about an axis parallel to the axis of rotation of its driving wheel 123. As the axis of rotation of the drive wheel 123 is moved, the axis of rotation of the ball 120 will vary accordingly to orient itself in a direction parallel to the axis of rotation of the drive wheel 123. As previously stated the rotation of the ball 120 is resolved between the two power take-off wheels 135 and 136, being distributed between these two wheels in a sine-cosine relationship. The speed of either of the take-off wheels 135 or 136 will vary as the cosine of the angle that the axis of rotation of the ball 120 makes with the axis of the power take-off wheel.

Thus, to change the distribution of take-off speeds from the ball 120 to the two power take-off wheels 135 and 136, it is only necessary to change the axis of rotation of the ball 120, and this is accomplished by steering the drive wheel 123 to change the position of its axis of rotation in a horizontal plane. The axis of rotation of the ball 120 will change accordingly, to orient itself in a position parallel to the axis of rotation of the drive wheel 123, to thereby vary the distribution of take-off speed between the take-off wheels 135 and 136, but always in a sine-cosine relationship.

As previously stated the steering of the drive wheel 123 is produced by the rotational movement of the tracer shaft 33, the drive wheel 123 rotating bodily in unison with the tracer shaft. The gear 130 which is driven by the tracer shaft 33 is fixedly secured to the bottom of the housing 167, and is journalled in the transmission housing 146 by a ball bearing 187. As the gear 130 is actuated by the rotational movement of the tracer shaft 33, it pivots the entire housing 167 with it, and since the shaft 174 is journalled in the housing 167, the drive wheel 123 pivots with the housing to change the position of its axis of rotation and produce the steering movement previously described.

It will be noted that the housing 167 extends upwardly within the transmission housing 146 from the gear 130 to embrace the shaft 165, and has formed at its upper end a sun gear 188 of the planetary gear system 159. In addition to being supported in the transmission housing 146 by the ball bearing 187, the housing 167 is also supported at its upper end by a ball bearing 189, so that the entire housing is free to rotate with respect to the transmission housing 146 in response to a rotational movement of the tracer shaft 33.

The double flanged collar 156 is supported by a pair of ball bearings 193 and 194, and is therefore free to rotate if not restrained. However, it will be recalled that as previously stated, the ring gear 154 which is fixed to the collar 156, remains relatively stationary in the operation of the planetary gear system 150. The reaction torque for preventing the collar 156 from rotating is obtained from the planetary gear system 159 as a result of the rotation of the bevel gear 166. As the bevel gear 166 revolves, it develops a tangential force which, in addition to driving its cooperating bevel gear 168, tends to drive the housing 167 in a rotational movement, since the housing is freely rotatable with respect to the shaft 165

Since the sun gear 188 is an integral part of the housing 167, the force tending to rotate the housing is transmitted by the sun gear 188 to a plurality of planetary gears 195 with which it is in meshing engagement. The planetary gears 195 are rotatably mounted in a bracket 196, the latter being fixedly secured to the transmission housing by screws 197 so that the planetary gears are prevented from moving in their orbit, although they are free to rotate about their own axes. Therefore, the force tending to rotate the planetary gears 195 is transmitted to the ring gear 158 with which the planetary gears 195 are in meshing engagement. This force urges the ring gear 158 in a direction opposite to the direction in which the ring gear 154 of the planetary gear system 150 is being urged by the motor shaft 122 through the planetary gears 152.

The opposing forces on the ring gears 158 and 154 balance each other to retain the collar 156 stationary unless another force is introduced to upset the balance. Such other force is produced in the planetary gear systems 150 and 159 when the tracer shaft 33 steers the drive wheel 123. As previously stated, the tracer shaft 33 steers the drive wheel 123 by effecting a rotational movement of the entire housing 167 and its related parts. Since the bevel gear 168 is rotatably supported by the housing 167, when the latter pivots it moves the bevel gear 168 bodily with it about the bevel gear 166. Such bodily movement of the bevel gear 168 about the bevel gear 166 would normally affect the speed of rotation of the drive wheel 123, causing either a decrease or increase in its speed, depending of course, upon the direction in which the bevel gear 168 was moved. Such variation in the speed of the drive wheel 123 would adversely effect the copying operation by introducing a slight error, and therefore the bodily movement of the bevel gear 168 about its cooperating bevel gear 166 is compensated for, through the planetary gear systems 150 and 159.

The pivotal movement of the housing 167 in response to the steering movement of the tracer shaft 33 causes the sun gear 188 to rotate with the housing since it is an integral part of it. The rotational movement of the sun gear 188 in response to the steering action of the tracer shaft 33 upsets the previously mentioned balance between the planetary gear systems 150 and 159 and operates to rotate the planetary gears 195 with which the sun gear 188 is in mesh. In view of the fact that the planetary gears 195 are restrained from orbital movement, their rotation causes a movement of their cooperating ring gear 158. Rotation of the ring gear 158 causes a corresponding rotation of the ring gear 154 of the planetary gear system 150, because of their connection by the collar 156.

Although the planetary gears 152 are being rotated in their orbit by the motor 121, this rotation remains constant, not being effected by the pivotal movement of the housing 167. Therefore, the rotational movement of the ring gear 154 as a result of the pivotal movement of the housing 167, serves to either increase or decrease the rotation of the planetary gears 152 about their own axes, depending of course, on the direction in which the rotation of the ring gear occurs. Since the sun gear 153 is being propelled by the rotation of the planetary gears 152 about their own axes, a change in the rate of rotation of the planetary gears 152 about their own axes produces a corresponding change in the rate of rotation of the sun gear 153, and therefore in the shaft 165 which is driven by the sun gear 153. The speed of rotation of the bevel gear 166 is changed accordingly, by reason of its connection to the shaft 165, such change in rotation of the bevel gear 166 being in an amount just sufficient to compensate for the error which would be introduced by the bodily movement of the bevel gear 168 about the bevel gear 166. In this manner the planetary gear systems 150 and 159 cooperate to compensate for any error which would be introduced by the steering effect of the tracer shaft 33 upon the drive wheel 123.

Thus, if the steering of the drive wheel 123 causes bodily movement of the bevel gear 168 about the bevel gear 166 to produce a decrease in the speed of the drive wheel 123, the rotational movement of the housing 167 would cause an increase in the speed of the bevel gear 166 through the planetary gear systems 150 and 159 as described, so that the rate of rotation of the drive wheel 123 will remain substantially constant. In like manner, if steering of the drive wheel 123 causes the bevel gear 168 to be moved bodily about the bevel gear 166 in a direction to produce an increase in the speed of the drive wheel 123, the planetary gear systems 150 and 159 will act as described, to decrease the speed of the bevel gear 166 a sufficient amount to compensate for the bodily movement of the bevel gear 168, and thereby preserve the uniformity of the rotation of the drive wheel 123.

The transmission of power to and from the ball 120 is accomplished by frictional contact with the ball, and it is therefore essential for maximum efficiency that tight frictional engagement be maintained between the drive wheel 123 and the ball, as well as between the power take-off wheels 135 and 136 and the ball. In the case of the drive wheel 123 such tight frictional engagement is maintained by yieldably urging the drive wheel against the ball 120 which, in turn, bears against the cooperating idler wheel 139.

The pressure for urging the drive wheel 123 against the ball 120 is developed by a plurality of compression springs 205 disposed in suitable openings in the bracket 196, and bearing against a collar 206 slidably mounted within the bracket 196. The collar 206, in turn, bears against the bearing 189 that supports the housing 167. Since the bracket 196 is fixed to the stationary housing 146, the springs 205 will urge the slidable collar 206 downwardly to likewise force the entire housing 167 downwardly through pressure on the bearing 189. The drive wheel 123 being rotatably supported in the housing 167 will be forced downwardly with the housing 167 against the ball 120 which, in turn, will be forced against its cooperating idler wheel 139. In this manner tight frictional engagement is maintained between the drive wheel 123 and the ball 120 to minimize slippage between these two elements.

In the case of the power take-off wheels 135 and 136, pressure is exerted upon the ball 120 by their respective idler wheels, as clearly shown in Fig. 4. Since both idler wheels are mounted identically, and are of the same construction, only one of them will be here described, although both are shown in Fig. 4. The idler wheel 137 is rotatably mounted in a bracket 210 in position for peripheral engagement with the ball 120. The bracket 210 is supported for pivotal movement about a pin 211 so that as the bracket is pivoted the idler wheel 137 will move with it either toward or away from the ball 120, depending upon the direction in which the bracket is pivoted.

The bracket 210 is provided with a bore 212 located opposite the pin 211. Disposed within the bore 212 is a compression spring 213 having its exposed end bearing against a cylindrical appendage 214 of the transmission housing 146. Since the cylindrical appendage 214 is integral with the transmission housing 146, the pressure of the spring 213 will serve to pivot the bracket 210 in a direction to force the idler wheel 137 into tight engagement with the ball 120. Such pressure on the ball 120 will cause it to bear tightly against the power take-off wheel 135 to maintain tight frictional engagement or traction between these elements and reduce slippage to a minimum.

The construction of the power take-off wheels 135 and 136 is clearly shown in Fig. 4. Both take-off wheels are also mounted identically and have the same construction, so only the take-off wheel 136 will be here described, it being shown in greater detail than the take-off wheel 135. The take-off wheel 136 is mounted on a stub shaft 219 which is formed integrally with a cover plate 220 rigidly secured to the cylindrical appendage 214 by suitable screws 221. The stub shaft 219 is embraced by an inner race 222 of a double row ball bearing 223, the inner race 222 being retained on the shaft 219 by a screw 224 and washers 225 as shown, the screw being threaded into the shaft 219. The power take-off wheel 136 is formed integrally with an outer race 226 of the ball bearing 223, the wheel extending laterally from the periphery of the outer race 226.

As the power take-off wheel 136 is rotated, the power is transmitted therefrom to a bell shaped cup 230 which is secured at its large end to the side of the power take-off wheel 135 at a point near the periphery of the wheel by screws 231. The small end of the cup 230 is fixed to the end of the output shaft 115, and is journalled in the cylindrical appendage 214 by a roller bearing 232.

The shafts 115 and 116 are connected to drive the table 15 and the carriage 10 respectively in their paths of movement as shown diagrammatically in Fig. 6. The shaft 115 is connected to rotate the drive screw 16 to rotate it for actuating the table 15 in its path of movement, the screw 16 being in threaded engagement with a nut 242 which is rigidly attached to the base 9. In the drawings the connection from the shift 115 to the drive screw 16 is represented diagrammatically by a broken line so as not to unnecessarily complicate the drawings. It will be understood that a variety of well known methods of construction may be employed for connecting the shaft 115 with the drive screw 16, as for example, by a flexible shaft.

In Fig. 1 the shaft 116 is shown as being directed into the housing of the carriage 10 for the purpose of driving the carriage in its path of movement in any well known manner. Fig. 7 shows diagrammatically one form of construction for actuating the carriage 10 by the shaft 116, the portion of the shaft within the carriage being shown as having keyed to it a bevel gear 245 disposed for meshing engagement with a cooperating bevel gear 246. The bevel gear 246 is keyed to a vertical shaft 247 which has fixed to its lower end another bevel gear 248 mounted in position to cooperate with a bevel gear 250 keyed to the end of a drive screw 251. The drive screw 251 is journalled in the carriage 10 in well known manner, and has threaded engagement with a nut 252 rigidly secured to the base 9, so that as the screw 251 is rotated, the carriage will be caused to move along the ways 12.

In summary, the apparatus comprises the tracer mechanism 27 adapted to vibrate the stylus 26 into and out of engagement with the pattern 25. As the contour of the pattern changes, a rotational movement is automatically imparted to the tracer shaft 33 for the purpose of maintaining the stylus 26 in position to vibrate into and out of engagement with the pattern 25. This rotational movement of the tracer shaft 33 in conformance with the contour of the pattern, functions to steer the drive wheel 123 into varying positions, to thereby change the axis of rotation of the ball 120.

As the axis of rotation of the ball 120 changes, the distribution of take-off speeds between the two power take-off wheels 135 and 136 changes accordingly, to vary the rate of movement of the carriage 10 and the table 15. Such change in the rate of movement of the two movable elements serves to effect relative movement between the stylus 26 and the pattern 25, and the cutter 23 and the workpiece 22, so that the stylus 26 will progress along the contour of the pattern at the same time that the cutter is reproducing the pattern 25 in the workpiece 22.

From the schematic illustration in Fig. 6 it can be readily observed how the steering of the drive wheel 123 affects the distribution of the power between the two power take-off wheels 135 and 136. With the drive wheel 123 in the position shown in Fig. 6, the axis of rotation of the ball 120 is parallel to the axis of rotation of the power take-off wheel 136, and 90° to the axis of rotation of the power take-off wheel 135. At this position the take-off wheel 136 is contacting the ball 120 at a point of maximum surface speed of the ball 120, while the take-off wheel 135 is contacting the ball at a point of no surface speed. With the elements in this position, the take-off wheel 136 is being driven at maximum speed, and the take-off wheel 135 is stationary. Therefore, there is no movement of the carriage 10, while the table 15 is being driven at maximum rate so that the cutter 23 will be cutting a straight line in the workpiece 22.

If the drive wheel 123 were steered to a position 90° from the present position in a counterclockwise direction as viewed from the top, it would be located in the same plane as the power take-off wheel 135. In this position, the take-off wheel 135 would be driven at maximum speed while the take-off wheel 136 would be stationary. The carriage 10 would then be driven at maximum rate, while the table 15 would remain stationary, and the cutter 23 would be cutting a straight line in the workpiece 22 at angle of 90° to the straight line being cut under the previously described position of the drive wheel 123.

On the other hand, if the drive wheel were steered in a counterclockwise direction, 45° from the position shown in Fig. 6, it would be at an angle midway between the planes of the take-off wheels 135 and 136. In this position the surface of the speed of the ball 120 at the points of contact with the power take-off wheels 135 and 136 be equal. Then both take-off wheels would be driven at the same rate at a speed approximately 71% of maximum speed. Under this condition, the carriage 10 and the table 15 would both be actuated, and both would be traveling at the same rate of speed. The cutter 23 would then be cutting a straight line at a resultant constant feed rate in the workpiece 22, but at an angle of 45° from either one of the straight lines cut under the previously described conditions.

Thus, it can be seen that as the axis of rotation of the ball 120 is changed by steering the drive wheel 123, the distribution of take-off speed from the ball 120 to the power take-off wheels 135 and 136 is changed accordingly, to vary the rate of travel of the carriage 10 and the table 15. As the axis of rotation of the ball 120 changes, it produces an increase in the speed of one of the movable elements while effecting a decrease in the rate of movement of the other movable element. The rate of movement always remaining in a sine-cosine relationship. With this arrangement, the rate of feed of the cutter 23 with respect to the workpiece 22 remains substantially constant irrespective of the direction in which the cutting operation is taking place.

From the foregoing explanation of the operation of the illustrated embodiment of the invention, it is apparent that there has been provided an improved pattern controlled machine tool in which a source of power is resolved by a ball into two components for effecting the two paths of movement between a cutter and a workpiece, the distribution of speeds from the ball to the two paths being varied in accordance with the contour of the pattern by varying the axis of rotation of the ball to achieve maximum effectiveness in reproducing the pattern with the highest degree of accuracy at rapid rates.

Although only one particular embodiment of the invention has been set forth in detail for the purpose of fully explaining its mode of operation, it is to be understood that the structure shown and described is intended to be illustrative only, and that various features of the invention may be otherwise utilized without departing from the spirit and scope of the invention, as defined in the subjoined claims.

The principle of the invention having been fully explained in connection with the foregoing description of the embodying apparatus, I hereby claim as my invention:

1. In a pattern controlled machine tool, a base, a source of power, a drive wheel connected to be rotated by said source of power, a sphere in contact with the periphery of said drive wheel to be rotated by it, a pair of power take-off wheels rotatably mounted with their axes of rotation in fixed relationship and their peripheries in contact with said sphere to be rotated by it, a pattern and work supporting table movably mounted on said base and connected to be driven in its path of movement by one of said power take-off wheels as it is rotated by said sphere, a spindle head mounted on said base for movement in a direction transverse to the movement of said table and connected to be driven in its path of movement by the other of said power take-off wheels as it is rotated by said sphere, a cutter rotatably carried by said spindle head in position to engage the work, and a tracer mounted on said spindle head in position to contact said pattern and connected to steer said drive wheel for varying the position of its axis of rotation in accordance with the dictates of the pattern to correspondingly vary the axis of rotation of said sphere and thereby vary the speed of said power take-off wheels in a definite relationship, whereby the rate of movement of said table and spindle head will be varied accordingly, to cause the cutter to reproduce the pattern in the work.

2. In a pattern controlled machine tool, a base, a cutter support and a work support mounted on said base for movement relative to each other in two mutually transverse directions, a source of power, a drive wheel connected to be driven by said source of power and having a revoluble axis of rotation to enable the drive wheel to be steered into various positions, a sphere rotatably mounted and having frictional contact with the periphery of said drive wheel to be rotated by it about an axis dependent upon the position of the drive wheel, a first power take-off wheel rotatably mounted with its periphery in frictional engagement with the surface of said sphere to be driven by it and connected to effect relative movement between said cutter support and said work support in one direction, a second power take-off wheel rotatably mounted with its periphery in frictional engagement with the surface of said sphere to be driven by it and connected to effect relative movement between said cutter support and said work support in a second direction, said power take-off wheels being mounted in position to engage the sphere so that the rate of rotation of the sphere will be resolved between them in a sine-cosine relationship, in a proportion dependent upon the position of the axis of rotation of said sphere, and a tracer supported in position to engage the pattern and connected to steer said drive wheel in accordance with the contour of the pattern to vary the power transmitted to said power take-off wheels and thereby vary the rates of movement between said cutter support and work support in their two paths of movement to cause the cutter to reproduce the pattern in the workpiece.

3. In a pattern controlled machine tool, a base, a cutter support and a work support mounted on said base for movement relative to each other in two mutually transverse directions, a sphere mounted for rotation about a plurality of axes selectively, driving means connected to drive said sphere about any of its axes, a pair of power take-off wheels rotatably mounted with their peripheries in frictional engagement with the surface of said sphere to be driven by it, each take-off wheel being connected to effect relative movement between said cutter support and said work support in one of the two directions of movement, said power take-off wheels being positioned relative to said sphere so that the rate of rotation of said sphere will be resolved amongst the take-off wheels in a definite relationship but in varying proportions depending upon the position of the axis of rotation of said sphere, and a tracer supported in position to engage the pattern, and connected to vary the axis of rotation of said sphere in response to the contour of the pattern to vary the rate of rotation of said power take-off wheels and thereby vary the rates of movement between said cutter and work supports in their two paths of movement to cause the cutter to reproduce the pattern in the workpiece.

4. In a pattern controlled machine tool, a base, a plurality of supports mounted on said base for movement relative to each other in several separate directions, a sphere mounted for rotation about a plurality of axes selectively, driving means connected to drive said sphere about any of its axes, a plurality of power take-offs connected to be motivated by said sphere at a rate dependent upon the position of the axis of rotation of said sphere, each of said power take-offs being connected to effect movement of one of said supports in one of the several directions of movement, and a tracer supported in position to engage the pattern and connected to vary the position of the axis of rotation of said sphere in response to the contour of the pattern, to vary the rate of movement of said power take-offs and thereby vary the rates of movement of said supports in their several paths of movement to cause the cutter to reproduce the pattern in the workpiece.

5. In a pattern controlled machine tool, a source of power, a mechanical transmission arranged to receive power from said source and variably resolve a unitary movement into two components in a definite rate relationship, one of said components being connected to produce relative movement between a cutter and workpiece in one direction, and the second of said components being connected to produce relative movement between said cutter and workpiece in a second direction, and a tracer connected to control said transmission to vary said components in accordance with the dictates of a pattern, so that the cutter will reproduce the pattern in the workpiece.

6. In a pattern controlled machine tool, a sphere mounted for rotation, a power take-off connected to be rotated by said rotating sphere, a second power take-off connected to be rotated by said rotating sphere in a definite relationship to the rate of rotation of said first power take-off, the first of said power take-offs being connected to furnish power for effecting relative movement between a cutter and workpiece in one direction, and the other of said power take-offs being connected for effecting relative movement between said cutter and workpiece in a second direction, and a tracer mounted in position to engage a pattern and connected to vary the axis of rotation of said sphere in response to the contour of the pattern, to thereby vary the rate of rotation of said power take-offs and thus change the rate of relative movement between said cutter and workpiece to cause the cutter to reproduce the pattern in the workpiece.

7. In a pattern controlled machine tool for reproducing the pattern in a workpiece, a base, a source of power, a cutter support and a work support mounted on said base for movement relative to each other in two mutually transverse paths, a drive wheel connected to be rotated by said source of power and mounted for bodily pivotal movement about an axis transverse to its axis of rotation so that its plane of rotation may be varied, a sphere mounted for rotation about infinitely variable axes, said sphere being in frictional driving engagement with said drive wheel to be driven by said drive wheel so that its axis of rotation may be varied by steering said drive wheel in its pivotal movement, a pair of power take-off wheels rotatably supported with their axes of rotation in fixed relationship and their peripheries in frictional driving engagement with said sphere to be rotated by it, one of said power take-off wheels being connected to furnish power for effecting relative movement between said cutter support and said work support in one path of movement, and the other of said power take-off wheels being connected for effecting relative movement between said cutter support and said work support in the second path of movement, and tracer means mounted on said cutter support in position to contact said pattern and connected to steer said drive wheel in its pivotal movement for varying the position of its axis of rotation in accordance with the dictates of the pattern to correspondingly vary the axis of rotation of said sphere, whereby the rate of relative movement between said cutter support and said work support in the two paths of movement will be varied accordingly to cause the cutter to reproduce the pattern in the workpiece.

8. In a pattern controlled machine tool for reproducing the pattern in a workpiece, a source of power, a base, a cutter support and a work support mounted on said base for movement relative to each other in two mutually transverse paths, a drive wheel connected to be rotated by said source of power and mounted for bodily pivotal movement about an axis transverse to its axis of rotation so that its plane of rotation may be varied, a sphere mounted for rotation about infinitely variable axes, said sphere being in frictional driving engagement with said drive wheel to be driven by said drive wheel so that its axis of rotation may be varied by steering said drive wheel in its pivotal movement, a pair of power take-off wheels rotatably supported with their axes of rotation in fixed relationship and their peripheries in frictional driving engagement with said sphere to be rotated by it, one of said power take-off wheels being connected to furnish power for effecting relative movement between said cutter support and said work support in one path of movement, and the other of said power take-off wheels being connected for effecting relative movement between said cutter support and said work support in the second path of movement, a tracer shaft rotatably supported by said cutter support, a stylus secured to said shaft in position to engage the pattern at a point in advance of the location of the axis of said tracer shaft along the contour of the pattern, means operably connected to urge said tracer shaft in its rotational movement to move said stylus into engagement with the contour of the pattern so that said tracer shaft is rotated to accommodate the contour of the pattern for moving said stylus into engagement therewith, and means operably connecting said tracer shaft to said drive wheel so that said tracer shaft steers said drive wheel in its pivotal movement as said tracer shaft is rotated in accordance with the dictates of the pattern to correspondingly vary the axis of rotation of said sphere and thereby vary the rate of rotation of said power take-off wheels in a definite relationship, whereby the rate of relative movement between said cutter support and said work support in the two paths of movement will be varied accordingly to cause the cutter to reproduce the pattern in the workpiece.

9. In a pattern controlled machine tool for reproducing the pattern in a workpiece, a source of power, a base, a cutter support and a work support mounted on said base for movement relative to each other in two mutually transverse paths, a drive wheel connected to be rotated by said source of power and mounted for bodily pivotal movement about an axis that is transverse to its axis of rotation so that its plane of rotation may be varied, a sphere mounted for rotation about infinitely variable axes, said sphere being in frictional driving engagement with said drive wheel to be driven by said drive wheel so that its axis of rotation may be varied by steering said drive wheel in its pivotal movement to change the plane of rotation of said drive wheel, a pair of power take-off wheels rotatably supported with their axes of rotation in fixed relationship and their peripheries in frictional driving engagement with said sphere to be rotated by it, one of said power take-off wheels being connected to furnish power for effecting relative movement between said cutter support and said work support in one path of movement, and the other of said power take-off wheels being connected for effecting relative movement between said cutter support and said work support in the second path of movement, a tracer shaft rotatably supported by said cutter support, a stylus fixed to said shaft in position to contact the pattern for producing control, the pattern being contacted at a point in advance of the location of the axis of said tracer shaft along the contour of the pattern, actuating means connected to actuate said tracer shaft in its rotational movement in either direction to move said stylus into or out of engagement with said pattern, a control circuit connected to control said actuating means in its direction of movement and responsive to the engagement of said stylus with said pattern to cause said actuating means to rotate said tracer shaft in a direction to move said stylus out of engagement with the pattern and responsive to the disengagement of said stylus with said pattern to cause said actuating means to rotate said tracer shaft in a direction to move said stylus into engagement with the pattern so that said stylus will be caused to vibrate into and out of engagement with the surface of the pattern as it is moved along its contour to effect a rotational movement of said tracer shaft in accordance with the contour of the pattern, and means operably connecting said tracer shaft to said drive wheel so that the rotational movement of said tracer shaft in accordance with the dictates of the pattern serves to steer said drive wheel in its pivotal movement to correspondingly vary the axis of rotation of said sphere and thereby vary the rate of rotation of said power take-off wheels in a definite relationship, whereby the rate of relative movement between said cutter support and said work support in the two paths of movement will be varied accordingly to cause the cutter to reproduce the pattern in the workpiece.

References Cited in the file of this patent

UNITED STATES PATENTS

| Number | Name | Date |
|---|---|---|
| 1,606,548 | Wells | Nov. 9, 1926 |
| 1,701,582 | Mengden | Feb. 12, 1929 |
| 2,116,593 | Bouvier et al. | May 10, 1938 |
| 2,218,838 | Alspaugh | Oct. 22, 1940 |
| 2,331,337 | Meyer | Oct. 12, 1943 |
| 2,334,956 | Ridgway | Nov. 23, 1943 |
| 2,511,956 | Wetzel | June 20, 1950 |
| 2,521,185 | Parsons | Sept. 5, 1950 |
| 2,540,989 | Newell | Feb. 6, 1951 |
| 2,586,421 | Evers | Feb. 19, 1952 |
| 2,723,598 | Mann | Nov. 15, 1955 |
| 2,723,845 | Przybylski et al. | Nov. 15, 1955 |